United States Patent
Matsumoto et al.

[11] Patent Number: 6,106,260
[45] Date of Patent: Aug. 22, 2000

[54] MOLD USEFUL IN THE PRODUCTION OF HOLLOW THERMOPLASTIC MOLDED ARTICLES

[75] Inventors: Masahito Matsumoto; Nobuhiro Usui, both of Osaka, Japan

[73] Assignee: Sumitomo Chemical Company, Limited, Osaka, Japan

[21] Appl. No.: 08/609,633

[22] Filed: Mar. 1, 1996

[30] Foreign Application Priority Data

Mar. 3, 1995 [JP] Japan .................................... 7-044172
Mar. 24, 1995 [JP] Japan .................................... 7-066025

[51] Int. Cl.$^7$ ................................................ B29C 45/16
[52] U.S. Cl. ........................................ 425/130; 264/572
[58] Field of Search .................................... 425/130, 112, 425/533; 264/572, 513, 516, 114

[56] References Cited

U.S. PATENT DOCUMENTS

| | | | |
|---|---|---|---|
| 3,612,158 | 10/1971 | Rossi | 249/135 |
| 3,734,449 | 5/1973 | Itou et al. | 249/114 |
| 5,204,050 | 4/1993 | Loren | 264/504 |
| 5,277,865 | 1/1994 | Hara . | |
| 5,284,429 | 2/1994 | Schneider et al. | 425/130 |
| 5,342,191 | 8/1994 | Shah et al. | 425/533 |
| 5,486,141 | 1/1996 | Eckardt et al. | 425/130 |
| 5,518,306 | 5/1996 | Hendry | 264/572 |
| 5,558,824 | 9/1996 | Shah et al. | 264/40.3 |

FOREIGN PATENT DOCUMENTS

| | | |
|---|---|---|
| 0 283 207 A3 | 9/1988 | European Pat. Off. . |
| 633121 A1 | 1/1995 | European Pat. Off. . |
| 684119 A2 | 11/1995 | European Pat. Off. . |
| 41 34 637 A1 | 4/1993 | Germany . |
| 3-164222 | 7/1991 | Japan . |
| 5-16177 | 1/1993 | Japan . |
| 6-304944 | 11/1994 | Japan . |
| WO 93/10955 | 6/1993 | WIPO . |
| WO 93/14919 | 8/1993 | WIPO . |

OTHER PUBLICATIONS

Patent Abstracts of Japan, vol. 96, No. 3, Mar. 29, 1996, & JP–A–07 299841.
Patent Abstracts of Japan, vol. 15, No. 505 (M–1194), Dec. 20, 1991, & JP–A–03 222713.
Patent Abstracts of Japan, vol. 95, No. 2, Mar. 31, 1995 & JP–A–06 328488.
Patent Abstracts of Japan, vol. 17, No. 88 (M–1370), Feb. 22, 1993 & JP–A–04 284213.
Patent Abstracts of Japan, vol. 96, No. 4, Apr. 30, 1996 & JP–A–07 314484.

*Primary Examiner*—Tim Heitbrink
*Attorney, Agent, or Firm*—Pillsbury Madison & Sutro LLP

[57] ABSTRACT

Molds useful in the production of polythermal plastic resin articles are disclosed. One of the molds disclosed contains a set of a female mold member and a male mold member having opposing mold surfaces respectively, wherein at least one of the mold members has a gas passage therein; and a gas introducing member having a tip and a gas path extending therethrough, the gas introducing member being disposed in at least one of the mold members such that the tip does not protrude from its respective mold surface, the gas path being in communication with the gas passage, wherein the gas introducing member is a molded piece having at least one of grooves in a peripheral part or penetrating holes through an interior thereof, with the grooves and holes communicating with the gas passage.

16 Claims, 5 Drawing Sheets

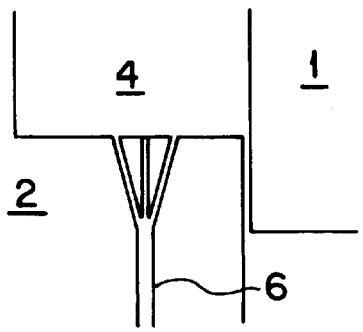
FIG. 4
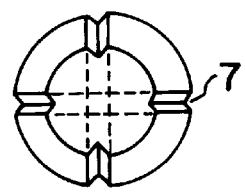 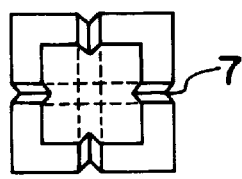
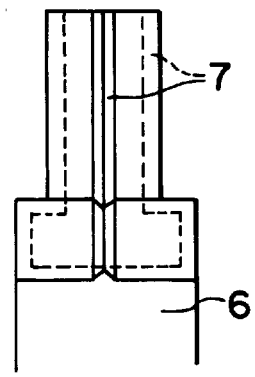 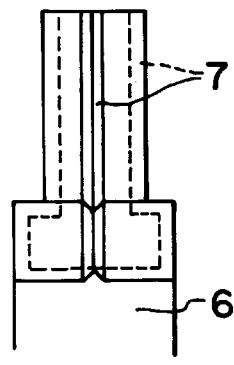
FIG. 5A     FIG. 5B
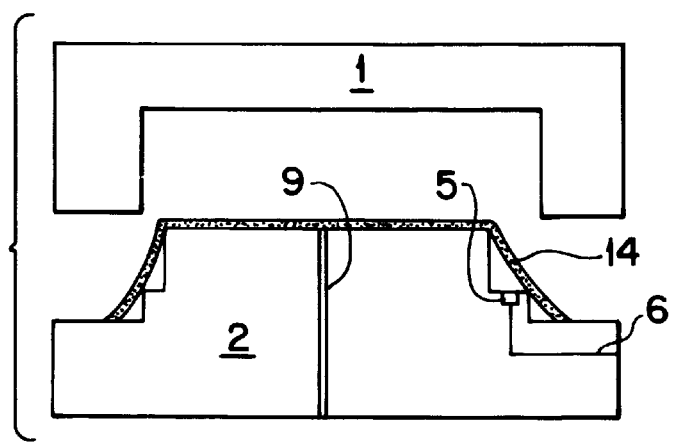
FIG. 6

MOLD USEFUL IN THE PRODUCTION OF HOLLOW THERMOPLASTIC MOLDED ARTICLES

BACKGROUND OF THE INVENTION

1. Field of the Invention

The present invention relates to a mold for production of a thermoplastic resin molded article having a hollow part, and a process for production of a thermoplastic resin molded article having a hollow part using the same mold. Hereinafter, a hollow thermoplastic resin molded article and a thermoplastic resin are referred to as "hollow molded article" and "resin", respectively.

2. Description of Related Art

Hollow molded articles have been produced, for example, by feeding molten resin into a cavity of a mold, provided with a movable or fixed gas introducing pin, as shown in FIG. 16, and directly introducing compressed air or high-pressure gas into the molten resin through a tip of the gas introducing pin which protrudes into the cavity (see, for example, JP-A 3-164222 and JP-A 5-16177).

However, the mold used in this method is costly due to the presence of the gas introducing pin and the design of the mold is restricted due to the larger space occupied by the gas introducing member in the mold. In addition, since a gas-ejecting hole of the gas introducing pin is easily choked with resin, maintenance of the gas introducing pin is costly and time consuming. In addition, a trace formed by pulling out the gas introducing pin after molding remains on the surface of the hollow molded articles produced by this method. Further, choking of the gas-ejecting hole with resin prevents gas introduction, which decreases the amount of introduced gas and leads to formation of an insufficient hollow part.

The object of the present invention is to provide a mold which can successfully form a hollow part in the interior of a thermoplastic resin molded article and yield a hollow molded article having a good appearance and a process for production of a hollow molded article using the same mold.

This object as well as other objects and advantages of the present invention will become apparent to those skilled in the art from the following description with reference to the accompanying drawings.

SUMMARY OF THE INVENTION

The present invention provides a mold for production of a hollow molded article which includes a pair of a female and a male mold members, wherein a gas passage is provided in either of the female or the male mold member, and a gas introducing member for introducing a gas into a cavity formed between the female and the male mold members is provided in communication with the gas passage such that a tip of the gas introducing member does not protrude into the cavity. The gas introducing member has a gas path which is open at its tip and is in communication with the gas passage in the mold. In the mold of the present invention, the gas introducing member is provided such that its tip does not protrude into the cavity. Thus, the above problems related to molds employing a gas introducing pin can be overcome.

In the mold of the present invention, the gas passage provided in either of the female or the male mold member may be directly opened on a cavity plane instead of through the gas introducing member.

In addition, in the mold of the present invention, the cavity plane provided with the gas passage may be further provided with a lagging material. Upon use of such a mold, since the formation of a skin layer on a surface of a resin is prevented by the action of the lagging material, the introduction of gas into the molten resin is promoted.

BRIEF DESCRIPTION OF THE DRAWINGS

FIG. 4 is a schematic enlarged cross-sectional view illustrating an area near an opening on the cavity plane from the gas passage in the present mold for production of a hollow molded article.

FIG. 5 is a schematic enlarged cross-sectional view of the gas introducing member. A circular molded piece or a square molded piece is provided with a groove or a penetrating hole as a gas path in FIG. 5A or in FIG. 5B, respectively.

FIG. 6 is a view illustrating one state where a hollow molded article is being produced by injection-compression molding using the present mold.

DETAILED DESCRIPTION OF THE INVENTION

Figure 1:
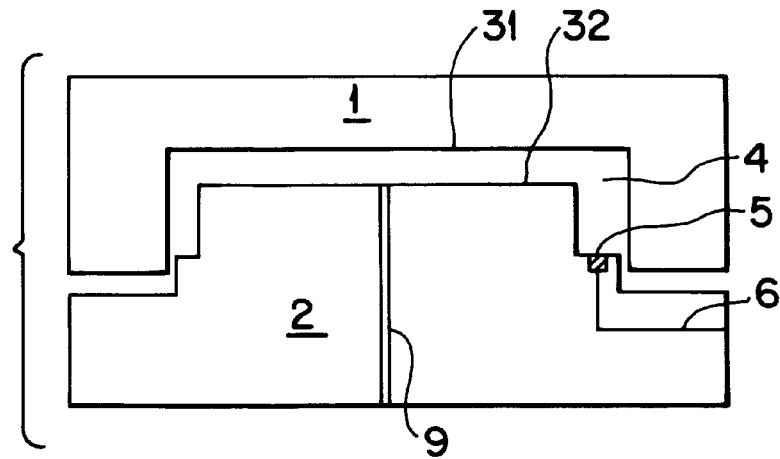
FIG. 1 is a schematic cross-sectional view of the present mold for production of a hollow molded article.
Figure 2:
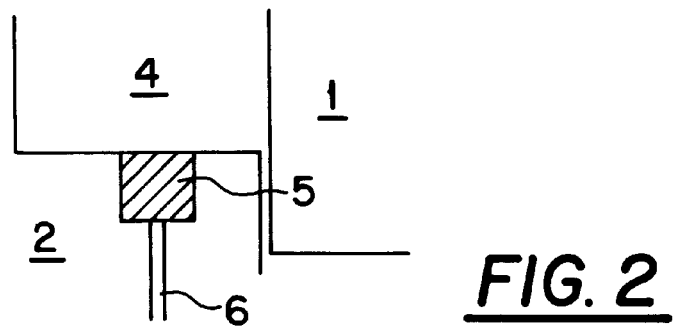
FIG. 2 is a schematic enlarged cross-sectional view illustrating an area near the gas introducing member of one embodiment of the present mold for production of a hollow molded article.
Figure 3:
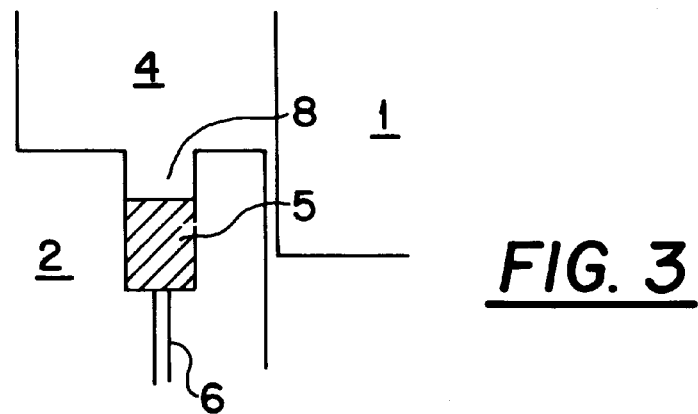
FIG. 3 is a schematic enlarged cross-sectional view illustrating an area near the gas introducing member of another embodiment of the present mold for production of a hollow molded article.
Figure 7:
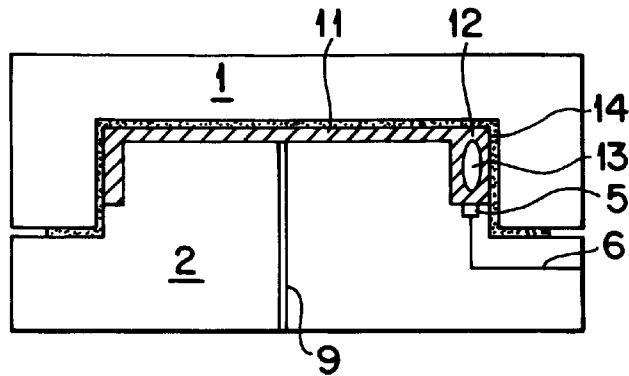
FIG. 7 is a view illustrating another state where a hollow molded article is being produced by injection-compression molding using the present mold.
Figure 8:
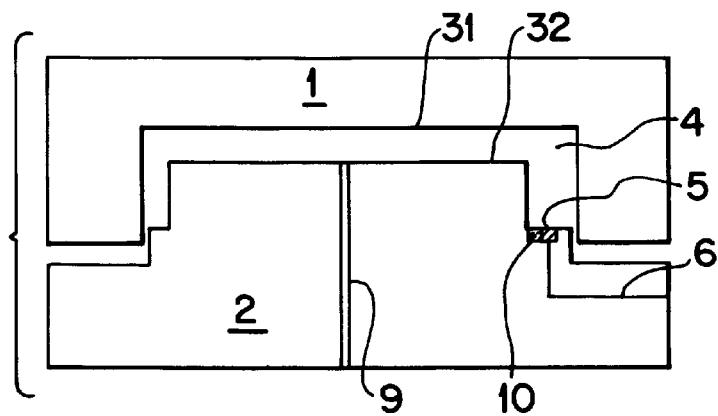
FIG. 8 is a schematic cross-sectional view of one embodiment of the present mold for production of a hollow molded article having a lagging material on the cavity plane.
Figure 9:
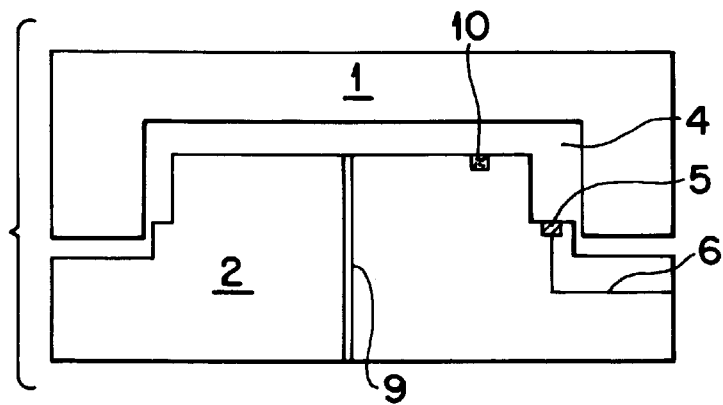
FIG. 9 is a schematic cross-sectional view of another embodiment of the present mold for production of a hollow molded article having a lagging material on the cavity plane.
Figure 10:
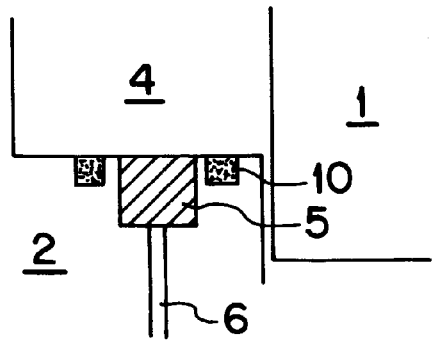
FIG. 10 is a schematic enlarged cross-sectional view illustrating one embodiment of an area near the gas introducing member and the lagging material in the present mold for production of a hollow molded article.

FIGS. 1 to 3 are schematic cross-sectional views illustrating embodiments of a mold of the present invention, which include a pair of a female and a male mold members 1, 2. In these embodiments, the female and the male mold members are designed so that a molded article having a partial thick part is formed in a cavity 4 formed between cavity planes 31 and 32. A gas passage 6 is provided in either the female or the male mold member (provided in the male mold member 2, in these embodiments). One end of the gas passage is connected to a gas feeding apparatus (not shown). A gas introducing member 5 for introducing gas fed from the gas passage into the cavity is provided at a position of the cavity plane provided with the gas passage, which corresponds to a position where a thick part of a molded article is formed, such that a tip of the gas introducing member does not protrude into the cavity. The cavity and the gas passage communicate via a gas path 7 such as a groove, a penetrating hole or the like provided on or in the gas introducing member.

In the present mold, the cavity 4 and the gas passage 6 communicate via the gas path 7 provided in the gas introducing member 5 and the gas introducing member is provided in the mold such that its tip does not protrude into the cavity.

The gas introducing member 5 may be any structure which enables gas to be passed through its outer periphery part and/or interior when provided in the mold, such that the tip does not protrude from the cavity plane. Molded pieces formed of a porous material which has many open-microcells which function as gas paths may preferably be used. Examples such porous materials include sintered metals, such as sintered copper and sintered stainless steel, sintered resin such as sintered fluorine plastic, expanded aluminum and porous ceramic, all of which may be used to form the gas introducing member in the present invention.

Alternatively, molded pieces having at least one of grooves or penetrating holes extending to the tip thereof at the outer periphery part and/or interior part, whether porous or nonporous, for example, as illustrated in FIGS. 5A and 5B, may be used as a gas introducing member. In this case, the grooves provided on the outer periphery part of the molded piece and the penetrating holes provided in the interior of the molded piece function as a gas path 7. The cross-sectional shape of the gas path relative to a gas flowing direction may be formed in any suitable manner, such as circular, rectangular, semicircular, V-shape, U-shape, etc. A gas introducing member of this sort is usually formed from a rigid material which has excellent heat resistance properties and is resistant to the pressure applied during resin molding. Examples of materials include metal and ceramics.

Gas is preferably introduced as a divided stream into the cavity 4 through the gas introducing member 5. Therefore, it is preferable that many gas paths are formed at the tip of the gas introducing member. When porous material is used, since the many fine holes of the material produce a divided stream, it may be used as the gas introducing member once molded into the desired shape. On the other hand, when the gas introducing member is a molded piece having gas paths formed on its outer peripheral part and/or interior, it is preferable that a plurality of grooves and penetrating holes are provided as a gas path.

In order to avoid choking the gas path due to the entrance of molten resin, the cross-sectional area of the opening into the cavity from each gas path is preferably not larger than 0.03 mm$^2$. Thus, when the gas introducing member is formed from porous material, the sectional area of the opening of each fine hole is preferably not larger than 0.03 mm$^2$. In particular, in the case of the mold used for injection molding, since the high resin pressure is applied to the tip of the gas introducing member during molding, the above sectional area is preferably smaller.

The size of the gas introducing member 5 is not specifically limited, but the cross-sectional area of the gas introducing member, parallel to the cavity plane, is usually not larger than 2 cm$^2$ in order to facilitate design of the mold. The length from the tip to the rear tip in the gas introducing member is usually at longest about 30 mm, and preferably shorter than 20 mm. The shape of the gas introducing member is arbitrary, for example, cylindrical or prism-like.

The gas introducing member 5 may be provided in either the female or the male mold member and preferably near a position corresponding to a position at which a hollow part is formed in the molded article. A plurality of gas introducing members may be provided depending upon the size of the cavity plane, and the number and size of a hollow part to be formed in the molded article. Respective gas introducing members may be the same or different. For example, as shown in FIG. 1, in order to form a hollow part 13 in a thick part of a molded article using a mold having a set of female and male mold members 1, 2 having a cavity 4 which is designed to form a partial thick part 12 in a molded article, the gas introducing member 5 should be situated at a position on the cavity plane of the molded article which corresponds to a position where the thick part is formed. A plurality of gas introducing members may be provided depending upon the size of the cavity plane and the size and the shape of the thick part in which the hollow portion is formed.

The gas introducing member 5 is preferably fitted into a concave part 8 formed in the mold, and the gas passage 6 is formed to open into the bottom part and/or the side part of the gas introduction member 5. The gas introducing member 5 is fitted so as to tightly contact the outer peripheral plane of the gas introducing member with the inner wall of the concave part so that the gas introducing member will not be dislodged by the pressure of the gas being fed through it, and will not be detached from the concave part due to attachment to resin upon removal of the hollow molded article from the mold. Usually, the gas introducing member is preferably shaped such that the area of the tip is slightly larger than that of the opening of the concave part before being inserted into the concave part because a gas introducing member with this shape is not easily detached from the concave part when fitted into the concave part.

In the present mold, the tip of the gas introducing member 5 does not protrude into the cavity. The tip of the gas introducing member and the cavity may form a continuous plane (plane having no level difference at a boundary) (FIG. 2) or the tip of the gas introducing member may be situated at a position lower than the surrounding cavity plane (FIG. 3). In this case, the depth of the concave part is preferably at most 30 mm and the distance between the tip of the gas introducing member and the cavity plane preferably is not very large.

The present invention also encompasses a mold wherein a gas passage 6 opens directly into the cavity plane instead of through a gas introduction member. In this case, the area and the shape of the gas passage which opens on the cavity plane are the same as those of the above gas path in the gas introducing member. In order to produce a divided stream of a gas, the gas passage is preferably divided into a plurality of ramificated paths having, for example, a rake shape (FIG. 4). The area over which the ramificated paths are distributed on the cavity plane is usually not larger than 2 cm$^2$.

In the present mold, the cavity plane 32 provided with the gas passage 6 is preferably provided further with a lagging material 10 (FIG. 8 to FIG. 12).

In order to successfully introduce gas into a molten resin upon production of a hollow molded article using the present mold, the formation of a skin layer on a surface of the molten resin must be prevented until completion of formation of a hollow part. One way of preventing formation of a skin layer is to raise the temperature of the mold. However, when the temperature of the mold is raised, the productivity is lowered because of the necessary longer period of time for cooling after mold closure. The applicants discovered that one way to solve this problem was to provide the cavity plane in the present mold with a lagging material.

As used herein, "a lagging material" means a member having the function of preventing formation of a skin layer on the surface of the molten resin in contact with the cavity plane by preventing the direct heat transfer between the molten resin fed into the cavity and the mold. Two exemplary lagging materials include a thermal insulant and a local-heater. Hereinafter, a local-heater is referred to as a "heater". The surface of the lagging material provided in the mold preferably forms part of the cavity plane.

Any lagging material 10 is fixed so that it is not protruding from the surrounding cavity plane. Preferably, the lagging material is embedded in the mold so that the surface thereof and the surrounding cavity plane form a continuous plane, that is, a level difference is not formed at the border between the lagging material and the surrounding cavity plane.

When the lagging material is a thermal insulant, the type of material is not particularly limited and any material having smaller heat conductivity than that of the material forming the mold may be used. Preferred materials for use as the thermal insulant are thermosetting resins such as epoxy resin, glass, pottery, wooden material, and heat-resistant engineering plastic (for example, Ekonol resin). These materials may be used alone or in appropriate combinations. For example, it is preferable that a thermal insulant having a rough surface such as wooden material or glass fiber is coated with pottery having a smooth surface. In another instance, the above various materials may be coated with the same material as that from which the mold is formed, but having a thickness which will not adversely affect the thermal insulating abilities of the lagging material.

The size of the thermal insulant is not limited and is sufficient when the thermal insulating effect prevents the skin layer from being formed on the thermal insulant. This will vary depending upon the various conditions such as the shape and the size of the mold, the kind of thermal insulant being used, the temperature of the molten resin, the temperature of the mold, etc. When the size of the thermal insulant is too large, the ability to cool the resin is inhibited after mold closure. When the size of the thermal insulant is too small, sufficient thermal insulating effects cannot be obtained. The shape of the thermal insulant is arbitrary, for example, circular, rectangular, annular, etc. The thermal insulant can be fixed by being tightly fitted into a concave part provided on the cavity plane and having the same shape as the shape of the thermal insulant, or by adhering the thermal insulant into the concave part, so as not to protrude from the cavity plane. Alternatively, when the thermal insulant is formed from thermosetting resin, the thermal insulant may be fixed by casting it into the concave part provided on the cavity plane and then curing it.

The thermal insulant is preferably provided near the gas introducing member 5 or near an opening on the cavity plane from the gas passage 6. Preferably, the thermal insulant is formed to contact the gas introducing member.

Figure 11:
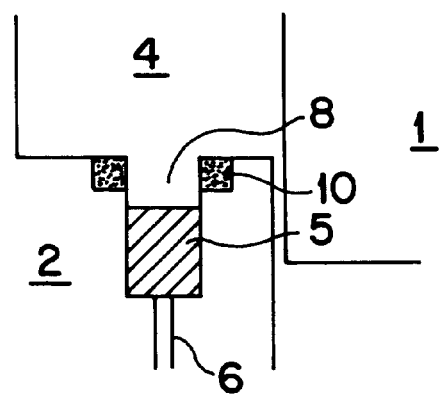
FIG. 11 is a schematic enlarged cross-sectional view illustrating another embodiment of an area near the gas introducing member and the lagging material in the present mold for production of a hollow molded article.
Figure 12:
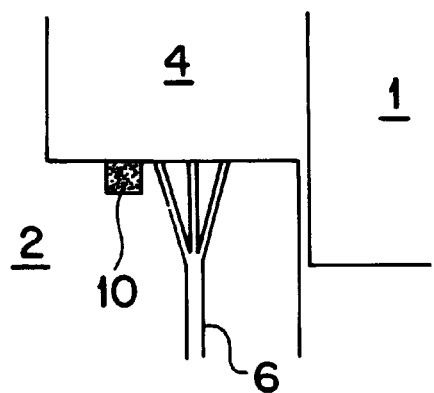
FIG. 12 is a schematic enlarged view illustrating an area near an opening on the cavity plane from the gas passage in the present mold for production of a hollow molded article.
Figure 13:
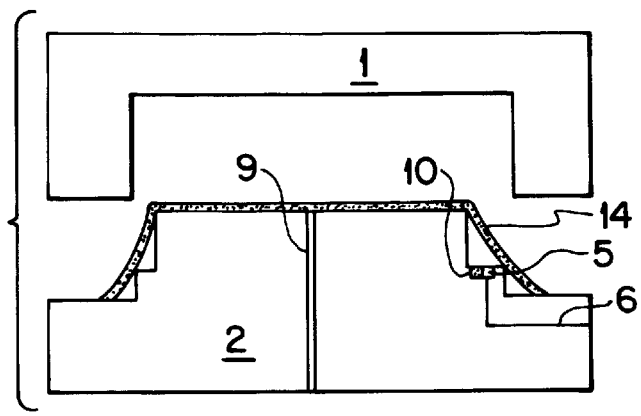
FIG. 13 is a view illustrating a further state where a hollow molded article is being produced by injection-compression molding using the present mold.
Figure 14:
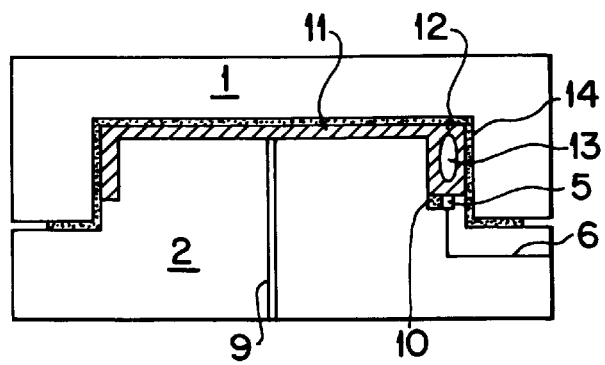
FIG. 14 is a view illustrating a still further state where a hollow molded article is being produced by injection-compression molding using the present mold.

For example, when the thermal insulant is provided near the gas introducing member, it can be provided continuously or discontinuously so as to surround the gas introducing member. Alternatively, the thermal insulant may be provided only upstream of the gas introducing member relative to the resin flow direction. When the thermal insulant is provided near the opening on the cavity from the gas passage, it is also provided as described above. When the tip of the gas introducing member is situated under the surrounding cavity plane, it is more effective when the thermal insulant is provided so as to form a part of the upper end (opening) of the concave part 8 into which the gas introducing member is fitted (FIG. 11). The number of the thermal insulant pieces to be fixed is arbitrary but preferably corresponds to the number of gas introducing member(s), the number of gas passage(s) which open onto the cavity plane, or the number of ramificated paths from the gas passage which open onto the cavity plane.

When the lagging material is a heater, it is provided in the mold to heat a portion of the cavity plane to be lagged. Two possible heating methods include electrical heating and high-frequency electrical induction heating. The heater must be able to attain a temperature higher than that of the mold. The temperature to be attained is sufficient when a skin layer is not formed on a molten resin in contact with a heater in a shorter period of time and, thus, an excessively high temperature is not required. The size and the shape of a part to be heated by a heater, a position of a heater to be provided, and the number of heaters are the same as described above with respect to the thermal insulant.

The present mold for production of a hollow molded article can be applied to various molding methods such as stamp molding, injection molding, injection-compression molding and the like. By using this mold, a hollow molded article can be easily produced.

A process for production of a hollow molded article using the present mold is described below.

Various inert gases such as air, nitrogen, carbonic acid gas and the like may be used as the gas to be fed into the cavity in order to form a hollow part upon production of a hollow molded article using the present mold. The pressure for feeding a gas is varied depending upon a kind of gas being used and various other molding conditions. In the case of molding where the pressure applied to a molten resin is relatively low, such as stamp molding and injection-compression molding, the pressure is usually not higher than 100 kg/cm$^2$. In the case of injection molding where a resin is fed at the higher pressure, the pressure is usually set to be higher than 100 kg/cm$^2$.

Feeding a gas into the cavity may be initiated at any time, either before or after completion of the feeding of a molten resin, as long as the resin fed into the cavity is molten. In addition, the gas is usually fed continuously until the molten resin is cooled to and has solidified.

Any thermoplastic resin can be used which is normally used for stamping molding, injection molding or injection-compression molding as any thermoplastic resin which constitutes a core material 15 of the molded article. In the present invention, the thermoplastic resin includes a thermoplastic elastomer. Examples of thermoplastic resins to be used in the present invention are thermoplastic resins such as polypropylene, polyethylene, acrylonitrile-styrene-butadiene block copolymer, polystyrene, polyvinyl chloride, polycarbonate, acrylic resin, polyacrylate, styrene-butadiene block copolymer and polyamide (for example, nylon), and thermoplastic elastomers such as EPM (ethylene-propylene copolymer) and EPDM (ethylene-propylene-nonconjugated dieneterpolymer), a mixture thereof, and polymer alloys obtained from the above polymers. If needed, thermoplastic resins may contain various conventional reinforcing fibers such as glass fiber, carbon fiber, organic fiber and the like, various organic fillers and inorganic fillers. In addition, thermoplastic resins may contain conventional various additives such as stabilizer, pigment, lubricant and antistatic agent.

In the situation where a skin material is used in the present invention, examples of the skin material are, for example, various conventional woven fabrics, knitted fabrics, unwoven fabrics, sheets or films of thermoplastic resin or thermoplastic elastomer, nets. These skin materials may be used alone or as a composite skin material obtained by laminating two or more skin materials by adhering or welding. Composite skin materials, such as polyvinyl chloride sheet and thermoplastic elastomer sheet (such as EPDM sheet), which are backed with an expanded sheet such as a polypropylene expanded sheet, may also be preferably used. The surface of the skin material may be decorated by convex-concave pattern such as skin grain, printing or staining, depending upon the use of the hollow molded article.

A process for production of a hollow molded article by injection-compression molding using the present mold is explained below (see FIGS. 6, 7, 13 and 14).

In the embodiment shown in these Figures, female and male mold members 1, 2 are designed to form a molded article having a partial thick part in the cavity 4 formed between the cavity planes 31, 32. The projected area of each cavity plane is 3000 cm$^2$. A gas introducing member 5 is provided at a position of the cavity plane 32 of the male mold member, which corresponds to a place where a thick part of a molded article is formed. The gas introducing member is formed of sintered stainless steel having the diameter of 15 mm and the length from a tip to a rear tip of 20 mm. The gas introducing member is fitted tightly into the cylindrical concave part 8, on the bottom of which the gas passage 6 is opened, having the diameter of 15 mm and the depth of 20 mm so that a continuous plane is formed by the tip of the gas introducing member and the surrounding cavity plane. A molten resin passage 9 is provided in the male mold member 2.

For example, a hollow molded article having a laminated skin material on the surface thereof can be produced using the above mold according to a method including the following steps:

(1) opening a female and a male mold members 1, 2 of the present mold so as to obtain a predetermined value of cavity clearance between cavity planes 31, 32;

(2) feeding a skin material 14 between the female and the male mold members;

(3) feeding a molten thermoplastic resin 11, for example polypropylene, between the skin material and the cavity plane 32 through the molten resin passage 9;

(4) closing the female mold member 1 down onto the male mold member almost at the same time that feeding of the molten resin is completed;

(5) feeding compressed air at a pressure of 9 kg/cm$^2$ into the cavity 4 through the tip of the gas introducing member 5 via the gas passage 6 while feeding the molten resin, and continuing to feed the gas until completion of molding of the resin (until solidification of the molten resin);

(6) after completion of mold closure (that is, after mold closure is carried out to an extent of predetermined cavity clearance), cooling the mold while maintaining a predetermined mold closure pressure to solidify the resin; and (7) after solidification of the resin, stopping gas feeding, opening the mold and removing the molded article.

Figure 15:
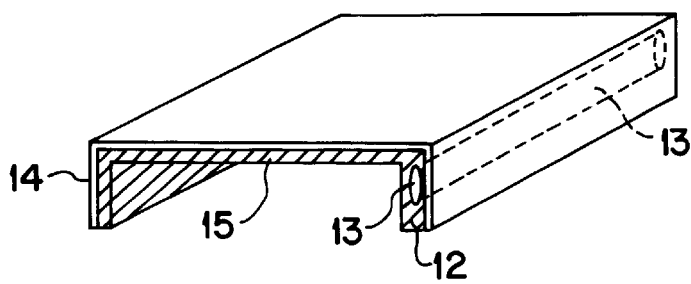
FIG. 15 is a perspective of a hollow molded article produced by using the present mold.
Figure 16:
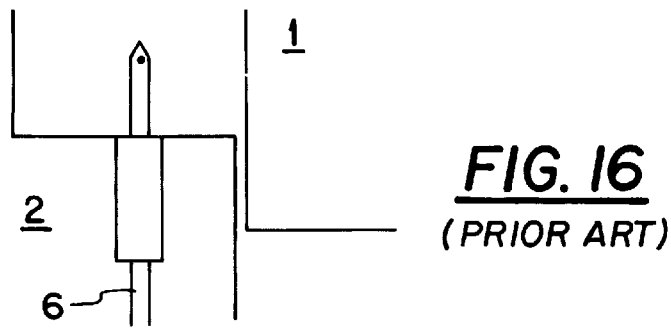
FIG. 16 is a schematic enlarged cross-sectional view illustrating an area near a gas introducing pin in the prior art mold.

According to the above process, a hollow molded article 17 is obtained in which a hollow part 13 is formed only at a thick part 12, a hollow part is not formed at thin part of main part of the molded article, and a skin material is laminated on the surface thereof, as shown in FIG. 15. In step (4), closing of the female mold member may be initiated while molten resin is being fed into the mold or after feeding the molten resin into the mold has been completed.

A hollow molded article 17 having no laminated skin material can be produced according to the above process, except for the use of a skin material, including the following steps:

(1) opening female and male mold members 1, 2 of the present mold to obtain a predetermined value of cavity clearance between cavity planes 31, 32;

(2) feeding molten thermoplastic resin 11 between the cavity planes through a molten resin passage 9;

(3) closing the female mold member 1, down onto the male mold member almost at the same time as feeding of the molten resin is completed;

(4) feeding compressed air into the cavity 4 through the tip of the gas introducing member 5 via the gas passage 6 while feeding molten resin, and continuing to feed the gas until completion of the molding of the resin (until solidification of the molten metal);

(5) after completion of mold closure, cooling the mold while maintaining a predetermined mold closure pressure to solidify the resin; and (6) after solidification of the resin, stopping gas feeding, opening the mold and removing molded article.

A process using the present mold provided with the gas introducing member 5 is described above. When a mold having a gas passage 6 directly opened on the cavity plane instead of having a gas introducing member or a mold further including a lagging material is used, a hollow molded article can be produced according to the same manner as that described above.

Since the present mold in which the gas introducing member is provided without protruding into the cavity has no gas introducing pin, not only production or repairing cost is reduced but also the limitation on mold design is lowered. Such a mold is very useful since a gas introducing member having a complex structure and provided with a gas path with a fine opening area can be easily prepared and a gas introducing member is exchangeable and is selected optionally from various types of gas introducing members depending upon molding condition, etc. In addition, since the present mold in which the gas passage provided therein is directly opened on the cavity plane and requires no gas introducing member for exclusive use, the limitation of mold design and mold production can be further lowered. Further, a mold having lagging material on the cavity plane assures the introduction of a gas into a molten resin and enables stable production of a hollow molded article. By using the present mold, a hollow molded article having good appearance and having no trace of a gas introducing pin (which cannot be avoided in the prior mold) can be easily produced.

What is claimed is:

1. A mold for production of a hollow thermoplastic resin-molded article comprising:

a set of a female mold member and a male mold member having opposing mold surfaces respectively, at least one mold member having a gas passage therein;

a gas introducing member having a tip and having a gas path extending therethrough to said tip, said gas introducing member being disposed in at least one of said mold members such that said tip does not protrude from its respective mold surface, said path being in communication with said gas passage, wherein said gas introduction member is a molded piece having at least one of grooves in a peripheral part or penetrating holes through an interior thereof, said grooves and holes communicating with said gas passage; and a lagging material in at least one of said opposing mold surfaces wherein said lagging material is provided around the periphery of said gas introducing member and in the mold member having a gas passage.

2. The mold for production a hollow thermoplastic resin molded article according to claim 1, wherein said lagging material is a thermal insulant.

3. The mold for production of a hollow thermoplastic resin molded article according to claim 1, wherein said lagging material is a local-heater.

4. A mold for the production of a hollow thermoplastic resin-molded article according to claim 1, wherein said lagging material is at least one selected from the group consisting of thermosetting resins, glass, pottery, wooden material and heat-resistant engineering plastic.

5. A mold for production of a hollow thermoplastic resin-molded article comprising:

a set of a female mold member and a male mold member having opposing mold surfaces respectively, at least one mold member having a gas passage therein;

a gas introducing member having a tip and having a gas path extending therethrough to said tip, said gas introducing member being disposed in at least one of said mold members such that said tip does not protrude from said mold surface, said gas path communication with said gas passage; and a lagging material at a said mold surface, wherein said lagging material is provided around the periphery of said gas introducing member and in the mold member having a gas passage.

6. The mold for production of a hollow thermoplastic resin molded article according to claim 5, wherein said lagging material is a thermal insulant.

7. The mold for production of a hollow thermoplastic resin molded article according to claim 5, wherein said lagging material is a local-heater.

8. The mold for production of a hollow thermoplastic resin molded article according to claim 5, wherein said gas introducing member is disposed so that said tip forms a continuous plane with a mold surface surrounding it.

9. The mold for production of a hollow thermoplastic resin molded article according to claim 5, wherein said gas introducing member is disposed so that said tip is at a lower level than a mold surface surrounding it.

10. The mold for production of a hollow thermoplastic resin molded article according to claim 5, wherein said gas introducing member is formed from a porous material.

11. The mold for production of a hollow thermoplastic resin molded article according to claim 5, wherein said mold surface of said female mold member has a first portion and a second portion and said mold surface of said male mold member has a third portion opposing to said first portion and a fourth portion opposing to said second portion, a distance between said first portion and said third portion being larger than a distance between said second portion and said fourth portion, and said gas introducing member is provided in at least one of said first portion or said third portion.

12. The mold for production of a hollow thermoplastic resin molding article according to claim 5, wherein said gas introducing member is disposed so that said tip forms a continuous plane with a mold surface surrounding it.

13. The mold for production of a hollow thermoplastic resin molded article according to claim 5, wherein said gas introducing member is disposed so that said tip is at a lower level than a mold surface surrounding it.

14. The mold for production of a hollow thermoplastic resin molded article according to claim 5, wherein said gas introducing member is formed from a porous material.

15. The mold for production of a hollow thermoplastic resin molded article according to claim 5, wherein said mold surface of said female mold member has a first portion and a second portion and said mold surface of said male mold member has a third portion opposing to said first portion and a fourth portion opposing to said second portion, a distance between said first portion and said third portion being larger than a distance between said second portion and said fourth portion, and said gas introducing member is provided in at least one of said first portion or said third portion.

16. A mold for production of a hollow thermoplastic resin molded article according to claim 5, wherein said lagging material is selected from the group consisting of thermosetting resins, glass, pottery, wooden material and heat-resistant engineering plastic.

* * * * *